US011719565B2

(12) United States Patent
Isenmann et al.

(10) Patent No.: US 11,719,565 B2
(45) Date of Patent: Aug. 8, 2023

(54) LEVEL SENSOR OR POINT LEVEL SENSOR WITH TEMPERATURE COMPENSATION

(71) Applicant: VEGA Grieshaber KG, Wolfach (DE)

(72) Inventors: Marius Isenmann, Zell am Harmersbach (DE); Christian Weinzierle, Wolfach (DE)

(73) Assignee: VEGA Grieshaber KG, Wolfach (DE)

( * ) Notice: Subject to any disclaimer, the term of this patent is extended or adjusted under 35 U.S.C. 154(b) by 7 days.

(21) Appl. No.: 17/253,930

(22) PCT Filed: Jun. 19, 2019

(86) PCT No.: PCT/EP2019/066281
§ 371 (c)(1),
(2) Date: Dec. 18, 2020

(87) PCT Pub. No.: WO2019/243458
PCT Pub. Date: Dec. 26, 2019

(65) Prior Publication Data
US 2021/0270657 A1    Sep. 2, 2021

(30) Foreign Application Priority Data

Jun. 19, 2018 (DE) ..................... 10 2018 209 904.9

(51) Int. Cl.
*G01F 23/00* (2022.01)
*G01F 23/263* (2022.01)
*G01F 23/80* (2022.01)

(52) U.S. Cl.
CPC ........ *G01F 23/0007* (2013.01); *G01F 23/266* (2013.01); *G01F 23/806* (2022.01)

(58) Field of Classification Search
CPC .... G01F 23/265; G01F 23/266; G01F 23/268; G01F 23/26; G01F 23/263; G01F 23/242;
(Continued)

(56) References Cited

U.S. PATENT DOCUMENTS 3,405,048 A * 10/1968 Soltz .................. G01N 27/4167
257/469
4,525,792 A * 6/1985 Clinton ................ G01F 23/266
307/118
(Continued)

FOREIGN PATENT DOCUMENTS

DE       1 237 467 B      3/1967
WO    WO-02084424 A1 * 10/2002   ........... G01B 5/0014

OTHER PUBLICATIONS

International Search Report dated Sep. 4, 2019 in PCT/EP2019/066281 filed on Jun. 19, 2019, 2 pages.

*Primary Examiner* — John Fitzgerald
*Assistant Examiner* — Truong D Phan
(74) *Attorney, Agent, or Firm* — Oblon, McClelland, Maier & Neustadt, L.L.P.

(57) ABSTRACT

A sensor is provided for generating an output signal for detecting a limit level of a medium, a filling level of the medium, and/or for differentiating between different media, the sensor including: a processor to process a measurement signal generated using the sensor; and a reference unit to generate a reference signal, the processor is further configured to perform temperature compensation using the reference signal, the processor and the reference unit each having a signal conversion unit to provide temperature-dependent signal conversion, the signal conversion units being thermally coupled to one another, and the temperature compensation includes compensating for temperature dependency of the signal conversion unit of the processor using a thermal coupling.

20 Claims, 5 Drawing Sheets

(58) Field of Classification Search
CPC ...... G01F 23/241; G01F 1/56; G01F 23/0007; G01F 23/806; G01F 3/224; G01F 15/02
See application file for complete search history.

(56) References Cited

U.S. PATENT DOCUMENTS

| | | | | |
|---|---|---|---|---|
| 4,596,961 | A * | 6/1986 | Hines | H03F 1/302 330/289 |
| 5,365,783 | A * | 11/1994 | Zweifel | G01F 23/268 73/304 C |
| 2014/0352402 | A1 * | 12/2014 | Hoch | G01F 23/806 73/1.73 |
| 2015/0323372 | A1 * | 11/2015 | Gunsay | G01F 23/26 73/304 C |

* cited by examiner

LEVEL SENSOR OR POINT LEVEL SENSOR WITH TEMPERATURE COMPENSATION

The present application claims the priority of German Patent Application No. 10 2018 209 904.9, filed on Jun. 19, 2018, which is incorporated into the present document in its entirety by reference.

For many applications, it is useful to detect limit levels using a point level sensor in order to avoid, for example, the overflowing or emptying of a container, in which a filling material is located. Typical applications for monitoring a limit level are, for example, process tanks, storage tanks, silos, or pipelines in the process industry. Such point level sensors are used, for example, for liquids as well as granulated and powdery bulk goods.

Depending on the properties of the filling material and the individual process conditions, different configurations are preferred for the point level switches. For example, TDR detectors (TDR: time domain reflectometry), conductive point level sensors, vibration limit switches as well as sensors operating according to the capacitive measuring principle are known. The point level sensor generates a switching command which, for example, starts or stops filling devices, such as conveyor belts or pumps.

Capacitive point level switches have the particular advantage that no mechanically moving parts have to be provided and that measurements can be taken through a wall made of electrically insulating material. As a result, no elaborate precautions have to be taken to avoid sealing problems.

The measurement signal detected by the point level sensor changes depending on whether the measuring probe of the point level sensor is surrounded by the filling material or not. The measurement signal can also depend on whether the measuring probe is clean or whether there are deposits of the filling material on said measuring probe.

However, it has been shown that, with many point level sensors, the detected measurement signal also depends on the temperature, to which the point level sensor is exposed. Due to different process temperatures, the temperature can fluctuate greatly over time, depending on the area of application, and also within the same area of application. As a result, a reliable limit level monitoring can be impaired. Similar problems occur with level sensors and with sensors for differentiating between different filling materials.

Therefore, there is a need for sensors for detecting the filling level, for monitoring the limit level, and/or for differentiating between different media, which allow for a more reliable evaluation of the measurement signal.

The embodiments provide a sensor for generating an output signal for detecting a limit level of a medium, a filling level of the medium and/or for differentiating between different media. The sensor has a processing unit for processing a measurement signal which was generated using the sensor, and a reference unit for generating a reference signal. The processing unit is configured to perform temperature compensation using the reference signal. The processing unit and the reference unit each have a signal conversion unit providing temperature-dependent signal conversion. The signal conversion units are thermally coupled to one another. The temperature compensation comprises compensating for the temperature dependency of the signal conversion unit of the processing unit using the thermal coupling.

The medium may be liquid and/or solid. In particular, the medium may be in powder form and/or in granulated form.

The measurement signal nay have a periodic AC voltage component or be a periodic AC voltage signal. The AC voltage component or the AC voltage signal may essentially be formed from frequency components in the high-frequency range. In the context of this application, "high frequency" refers to frequencies which are greater than 50 MHz. The high-frequency range may relate to frequencies that are less than 500 MHz.

The AC voltage signal or the AC voltage component of the measurement signal may be amplitude-modulated. The frequencies of the amplitude modulation may be less than 200 kHz or less than 50 kHz. The measurement signal may have a DC voltage component as an offset.

The reference signal may be a DC voltage signal. However, other forms of the reference signal are also conceivable. The reference unit may receive an input signal, in which case the reference unit generates the reference signal on the basis of the input signal. The input signal may be temperature-independent or essentially temperature-independent. Additionally or alternatively, the input signal may be a DC voltage signal.

The temperature compensation may be configured to compensate for a temperature dependency that is generated when the measurement signal is processed. The output signal may, for example, indicate a limit level (such as "limit level reached" and "limit level not reached"). Additionally or alternatively, the output signal may indicate a filling level, for example, a filling height in metres. Additionally or alternatively, the output signal may indicate a predefined media class (such as "ketchup") if the output signal is configured to differentiate between different media.

The signal conversion unit of the processing unit may have a diode. The diode may act as a rectifier. The rectifier diode may be part of a demodulator. The demodulator may be an amplitude demodulator (envelope demodulator).

The signal conversion units may be configured to be identical or essentially identical. The signal conversion units may provide the same or essentially the same signal conversion of an input signal into an output signal. For each of the signal conversion units, the respective signal conversion is temperature-dependent. The temperature dependencies may be the same or essentially the same.

The thermal coupling may be configured such that the signal conversion units are in a thermally conductive connection with one another. Alternatively or additionally, it is conceivable that the signal conversion units are each in a thermally conductive connection with an identical thermal reservoir. The thermal reservoir may be, for example, the medium or a container that contains the medium. The thermal coupling may take place, for example, using a thermally conductive medium, such as a heat-conducting paste.

The housing may have one or more external connection ports for connecting to the signal conversion units arranged in the interior of the housing. The semiconductor module may be configured, for example, as an SMD module.

According to one embodiment, the signal conversion units are arranged in a common housing, wherein the thermal coupling is effected using the common housing. According to a further embodiment, the signal conversion units are each part of a common semiconductor module.

According to a further embodiment, the signal conversion unit of the evaluation unit is part of a demodulator.

According to a further embodiment, the signal conversion units each have a diode or consist of a diode.

According to a further embodiment, the sensor is configured to form a probe impedance using the medium. The measurement signal may depend on the probe impedance.

The probe impedance may be generated using electric and/or magnetic fields which extend at least partially through the medium. The sensor may have one or more electrodes and/or coils for generating the electric and/or the magnetic field. In particular, the probe impedance may have a capacitance for a capacitive measurement on the medium.

The capacitance of the probe impedance may have a sensor electrode which is arranged at a distal end of a sensor arm of the sensor. A corresponding electrode of the capacitance may have a tubular component of the sensor, at the distal end of which the sensor electrode is arranged.

According to a further embodiment, the sensor has an inductance which is connected in series to a capacitance electrode of the sensor. The capacitance electrode may be configured for a capacitive measurement on the medium.

According to a further embodiment, the sensor is configured to apply a signal, which is an AC voltage signal or has an AC voltage component, to the probe impedance.

The signal to be applied to the probe impedance may be periodic or essentially periodic. The sensor may be configured to gradually or continuously change an oscillation frequency of the essentially periodic signal. For example, the sensor may have a frequency ramp generator. The signal to be applied to the probe impedance may be unmodulated or essentially unmodulated.

According to a further embodiment, the processing unit generates an amplified or unamplified signal difference. The signal difference may be generated on the basis of the reference signal. The processing unit may have a differential amplifier. The differential amplifier may receive the reference signal as an input signal. The signal difference can be a difference between the reference signal and a further signal which is generated on the basis of the measurement signal. The further signal may be the amplitude-demodulated measurement signal, in which case the measurement signal has an AC voltage component and a DC voltage component. Additionally or alternatively, the further signal may be an amplitude-modulated signal of a signal that was generated by adding a DC voltage component to the measurement signal.

According to one embodiment, the reference signal is a DC voltage signal. The sensor may be configured such that the DC voltage signal may be adjusted in a controllable manner. The sensor may have a temperature sensor for detecting a temperature. Furthermore, the sensor may be configured to adjust the DC voltage signal on the basis of the detected temperature.

According to one embodiment, the reference unit receives an input signal which is a DC voltage signal. The reference unit may generate the reference signal on the basis of the input signal. In particular, the input signal of the reference unit may be applied to the signal conversion unit, particularly to the diode, of the reference unit. The input signal may be applied to an input of the diode, as seen looking in the forward direction. Alternatively or additionally, the reference signal may be generated at an output of the diode, as seen looking in the forward direction. Alternatively, the reference unit may generate the reference signal on the basis of the signal at the output of the diode.

According to a further embodiment, the measurement signal has an AC voltage component and a DC voltage component. For example, the sensor may have a circuit which adds a DC voltage component to an AC voltage signal. The sensor may be configured such that the level of the DC voltage component is controllably adjustable. The sensor may have a temperature sensor for detecting a temperature. Furthermore, the sensor may be configured to adjust the level of the DC voltage component on the basis of the detected temperature.

The sensor may be configured to adjust the DC voltage component such that positive amplitude maxima of the AC voltage component are higher than a threshold voltage of the diode of the signal conversion unit of the processing unit.

According to a further embodiment, the signal conversion unit of the processing unit has a diode. The diode may act as a rectifier.

According to a further embodiment, the diode of the signal conversion unit of the processing unit forms part of a demodulator of the processing unit. According to a further embodiment, the demodulator is an amplitude demodulator.

According to a further embodiment, the sensor has a temperature sensor. The temperature sensor may be arranged and configured to detect a temperature value of the temperature-dependent signal conversion. The sensor may be arranged and configured to detect a temperature value of the signal conversion units of the processing unit and the signal conversion unit of the reference unit. The temperature sensor may be thermally coupled to the signal conversion units.

According to a further embodiment, the sensor is configured to adjust a level of the input signal of the reference unit and/or a level of the DC voltage component of the measurement signal on the basis of the detected temperature value. The adjustment may be made, for example, using a lookup table. The lookup table may be stored in a data storage device of the sensor.

The above-mentioned and further advantageous features of the present disclosure will become even more apparent from the following detailed description of the exemplary embodiments with reference to the accompanying drawings. It must be noted that not all possible embodiments of the present disclosure necessarily achieve all or some of the advantages set forth herein.

Figure 1:
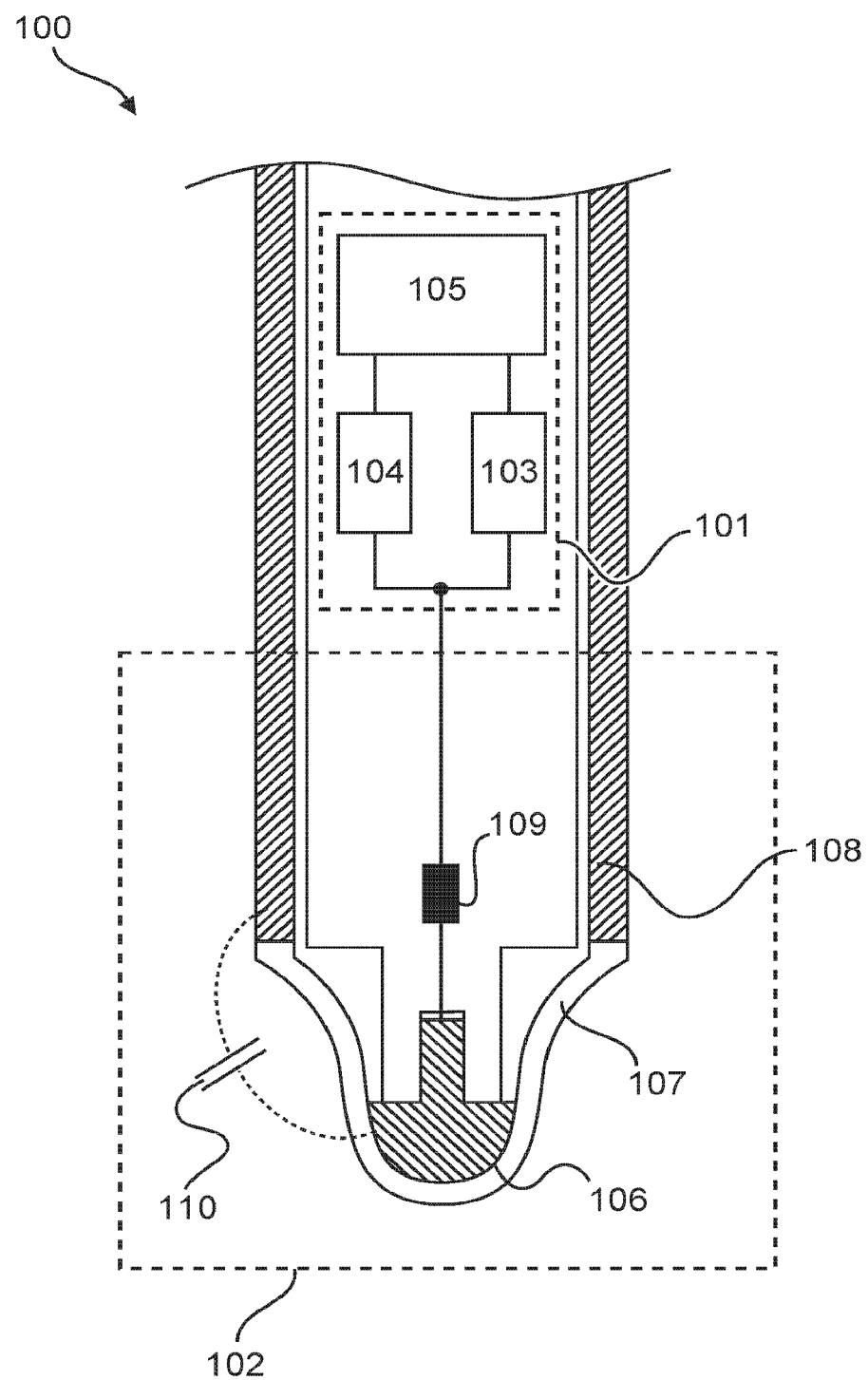
FIG. 1 shows a schematic view of a structure of a sensor according to an embodiment.

FIG. 1 shows a schematic view of a sensor 100 according to one embodiment, which is configured as a point level sensor. The sensor 100 is configured particularly as an impedance point level sensor, in which measurements of impedance values of a probe impedance are used to monitor the limit level of a medium. The medium may be, for example, a filling medium within a container.

In the embodiment shown, the probe impedance has a capacitance, the electrical fields of which extend at least partially through the medium. However, alternatively or additionally, it is also conceivable that electrical and/or magnetic fields of an ohmic resistance and/or an impedance extend through the medium.

However, the present invention is not limited to such a sensor for limit level monitoring. It is conceivable that one or more aspects of the present invention are used to form sensors which detect the filling level of a medium and/or which differentiate between different media.

As shall be described in more detail below, the sensor 100 is configured as a resonance sensor. The sensor 100 applies a signal, which has an AC voltage component or which is an AC voltage signal, to the probe impedance. The signal to be applied to the probe impedance is an essentially periodic signal of a time-varying frequency. The sensor 100 is also configured to detect one or more parameters of a resonance behaviour of the probe impedance. As shall be described in more detail below, the sensor 100 determines a signal amplitude at a resonance frequency and the frequency value of the resonance frequency, which each depend on the probe impedance. Alternatively or additionally, it is also conceivable that the point level sensor detects other parameters, such as the sharpness of resonance (also referred to as resonance quality or Q factor), a change in the frequency value of the resonance frequency, and/or a change in the signal amplitude at the resonance frequency.

As shown in FIG. 1, the sensor 100 has a measuring probe 102, which has a measuring electrode 106, an insulation 107, and a reference electrode 108. The measuring electrode 106 and the reference electrode 108 form a corresponding pair of electrodes, between which the measuring capacitance 110 is formed, which is part of the probe impedance. The measuring electrode 106 and the reference electrode 108 are configured such that field lines of the measuring capacitance 110 extend through a spatial area, in which the medium is located in the filled state. The measuring electrode 106 and the reference electrode 108 are therefore configured for capacitive measurement on the medium. It is conceivable that the sensor 100 is configured such that the reference electrode 108 is at least partially provided by the wall of the container that contains the medium.

The electrodes 106 and 108 are made of metal. The insulation, for example, may be made of plastic, particularly PEEK (polyether ether ketone). The reference electrode 108 is configured to be tubular, wherein the measuring electrode 106 is arranged at a distal end of the reference electrode 108. The insulation 107 forms a sealing closure at a distal end of the reference electrode 108, wherein the measuring electrode 106 is arranged in a, thus formed, interior space of the measuring probe 102. In the filled state, a distal end section of the measuring probe 102 is surrounded by the medium such that an end section of the reference electrode 108 is in contact with the medium. However, it is also conceivable that the sensor 100 is configured such that a filled state is detected when the medium is at a distance from the distal end section of the measuring probe 102, said distance being less than a predefined distance.

The probe 102 also has an inductance 109, which is connected in series to the measuring electrode 106 and thus with the measuring capacitance 110. In the embodiment shown, the inductance 109 is configured to be discrete. This means particularly that the inductance is configured as a separate component from the other components. For example, the inductance 109 may be configured as an air-core coil. The inductance value of the inductance 109 is selected such that the resonance frequency, which depends on the inductance 109 and the measuring capacitance 110, is between 100 MHz and 200 MHz for different media to be measured and/or filling states (full, empty with deposits of filling material, or empty without deposits of filling material). An inductance value of the inductance 109 may be, for example, in a range between 0.5 nanohenry and 1000 nanohenry, particularly in a range between 0.5 nanohenry and 700 nanohenry, or in a range between 0.5 nanohenry and 200 nanohenry.

The sensor 100 furthermore has a control and evaluation unit 101 which has a signal generation unit 103, a processing unit 104, and a control unit 105. The signal generation unit 103 is configured to apply a probe signal to the probe impedance which consists of the inductance 109 and the measuring capacitance 110. The processing unit 104 is configured to process a measurement signal which is generated using the probe impedance, to which the probe signal is applied. The control unit 105 is configured to determine the frequency value of the resonance frequency and an amplitude value at the resonance frequency, which depends on an absolute value of the probe impedance at the resonance frequency. On the basis of the determined values, the control unit 105 generates an output signal of the sensor 100, for example, in the form of one or more switching commands.

Figure 2:
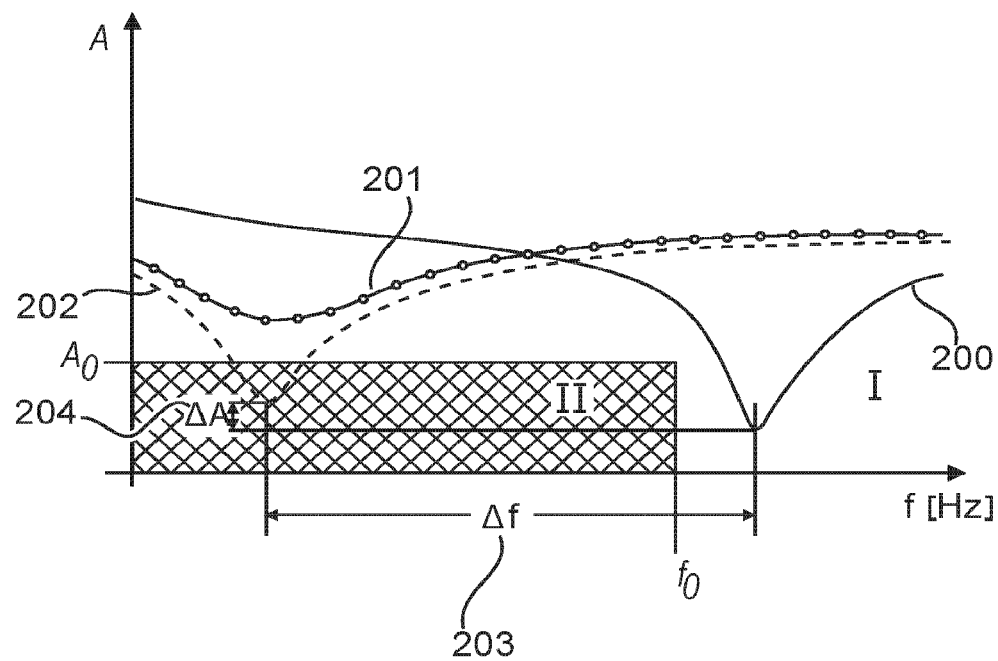
FIG. 2 shows a schematic view of the monitoring of a limit level using the evaluation unit of the sensor shown in FIG. 1 according to the embodiment.

FIG. 2 is a schematic view of the monitoring of the limit level by the sensor 100 on the basis of the determined frequency value of the resonance frequency and on the basis of the determined signal amplitude at the resonance frequency. The curve 200 shows the frequency-dependent course of the signal amplitude A when the measuring probe is clean (i.e., without deposits of the medium on the point level sensor) when the filling level of the medium is lower than the predefined limit level. The curve 201 shows the frequency-dependent course of the signal amplitude A when the filling level is lower than the predefined limit level, but with deposits of the medium (such as deposits of ketchup) on the sensor. The curve 202 shows the frequency-dependent course of the signal amplitude A when the filling level is greater than or equal to the predefined limit level, i.e., when the distal end section of the measuring probe 102 (shown in FIG. 1) is covered by the medium.

As shall be described below, the switching commands "empty" and "full" are generated by the control unit 105 on the basis of the frequency value f of the resonance frequency and on the basis of the amplitude value A of the measurement signal at the resonance frequency. The amplitude value A depends on the absolute value of the probe impedance. If the minimum is in range I, i.e., if the frequency value of the resonance frequency is greater than a frequency value $f_0$ or if the amplitude at the resonance frequency is greater than an amplitude value $A_0$, the control unit 150 outputs the switching command "empty." However, if the minimum is in range II, i.e., if the resonance frequency is at a frequency value which is lower than the frequency value $f_0$ and the amplitude value is less than the amplitude value $z_0$, the switching command "full" is output.

The two switching ranges I and II, defined by the frequency value $f_0$ and the amplitude value $A_0$, may be invariably fixed, for example, during the production of the sensor. Alternatively, it is conceivable that the sensor is configured such that switching ranges I and II are configurable by a user. For example, it is conceivable that the frequency value $f_0$ and/or the amplitude value $A_0$ is adjustable using a user interface of the sensor. However, it has been shown that, for many applications, the frequency value $f_0$ and the amplitude value $A_0$ may be selected such that invariably fixed values are sufficient to ensure a reliable limit level monitoring. As a result, an adjustment by the customer, which may be time-consuming, may be omitted.

Figure 3:
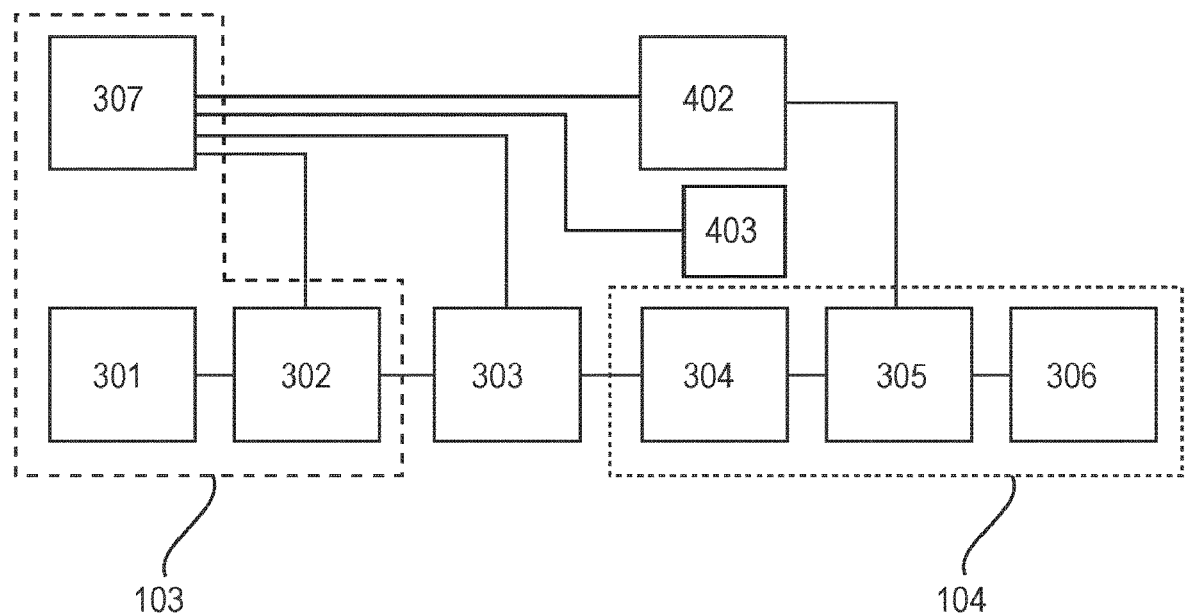
FIG. 3 shows a schematic block diagram of the sensor shown in FIG. 1 according to the embodiment.
Figure 4:
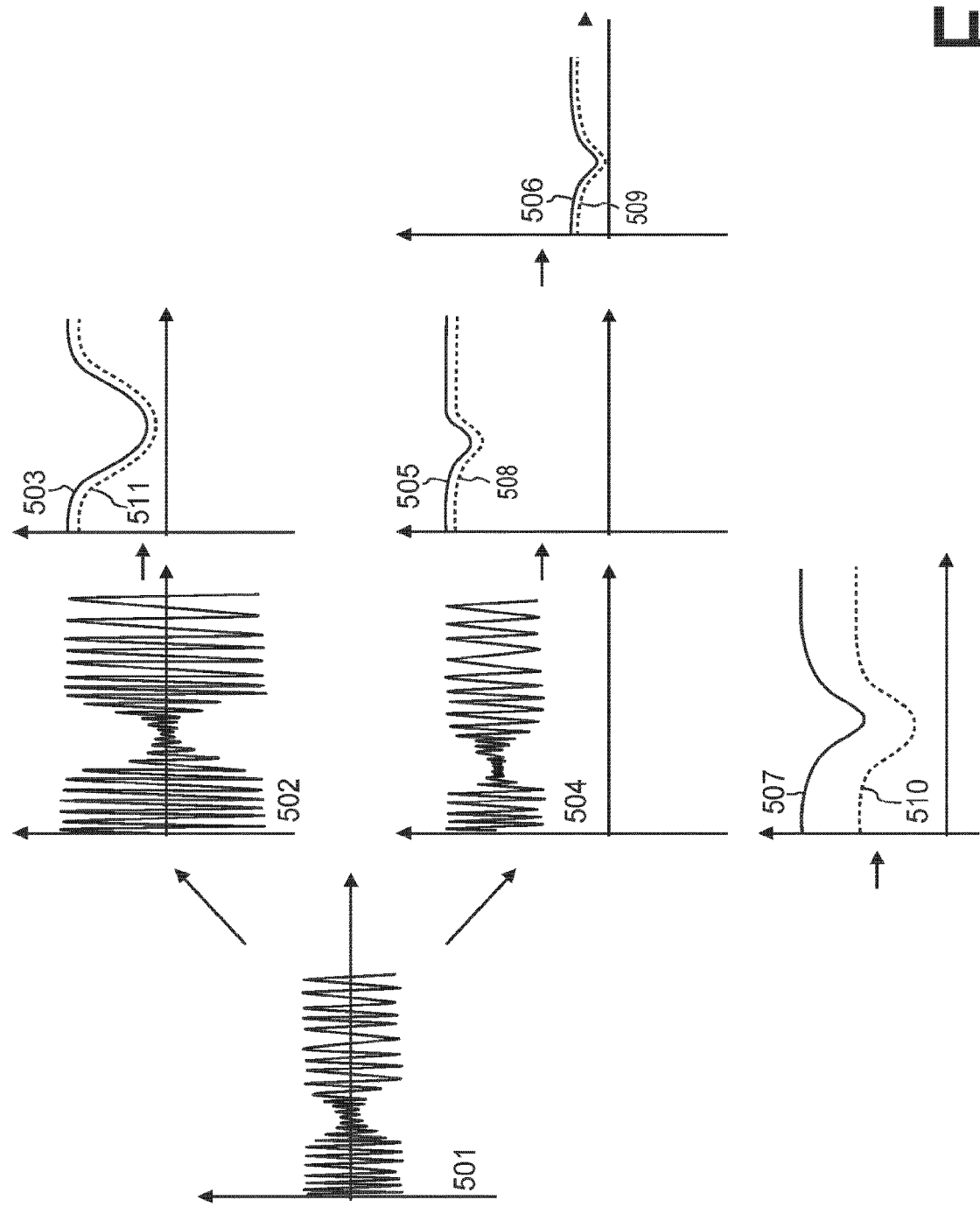
FIG. 4 shows a schematic view of the signals generated by the sensor, in comparison with a comparative example, in which a high-frequency amplifier is used and which is not part of the claimed subject matter.

FIG. 3 shows a schematic block diagram of the signal generation unit 103, the processing unit 104, the probe impedance 303, and a reference unit 402 of the sensor, which shall be described in more detail below. FIG. 4 shows a schematic view of the signals generated by the signal generation unit 103 and by the processing unit 104 using the probe impedance 303.

The signal generation unit 103 has a supply unit 307, a D/A converter 301, and a voltage-controlled oscillator 302

(VCO). The oscillator 302 is connected to the supply unit 307 and is controlled using the D/A converter with a voltage ramp at the input. As a result, a source signal is generated at an output of the oscillator 302, said source signal being an AC voltage signal of constant amplitude and having a frequency ramp over a predefined or a user-configurable frequency sweep range. However, it is also conceivable that the amplitude maxima of the source signal change periodically or non-periodically. Additionally or alternatively, it is conceivable that the source signal does not have a continuous frequency ramp, but that the frequency changes step-wise in temporally successive steps. The source signal may, for example, sweep through a frequency range between 100 MHz and 200 MHz continuously and/or step-wise.

The source signal is used to apply a voltage to the probe impedance 303, which is formed from the inductance 109 (shown in FIG. 1) and the measuring capacitance 110, said voltage being an AC voltage signal or having an AC voltage component, wherein the frequency is changed continuously and/or step-wise. The resulting resonance behaviour is processed using the processing unit 104. As shown in FIG. 3, the processing unit 104 has an amplitude demodulator 304 (envelope demodulator) and an amplification unit 305, which is connected downstream of the amplitude demodulator 304. The amplified signal, which represents the resonance curve, is digitised using an A/D converter 306 of the processing unit 104. The resonance curve is analysed by the control unit 105 (shown in FIG. 2) using the digitised signal, and the output signal of the sensor is generated.

The signal 501 of FIG. 4 shows the AC voltage component of the measurement signal, which is obtained using the probe impedance, to which the source signal is applied. The signal 501 has frequency components of the frequency ramp of the source signal, which form the carrier signal, wherein the carrier signal is amplitude-modulated due to the resonance behaviour of the probe impedance. The signal amplitude is reduced at the resonance frequency because the absolute value of the impedance of the probe impedance exhibits a minimum at the resonance frequency.

As shown by the signal 504, the measurement signal contains, in addition to the AC voltage component, a DC voltage component in order to provide a signal 504 with higher signal values. As a result, the signal values of the input signal of the amplitude demodulator (shown in FIG. 3) are increased such that the positive amplitude maxima of the DC voltage component exceed the threshold voltage of a diode of the amplitude demodulator 304, which is used for rectification. However, additionally or alternatively, it is also conceivable that the signal 501 is generated as the measurement signal and a DC voltage component is added using a separate, downstream circuit, which is arranged, for example, in the processing unit 104, in order to obtain the signal 504.

As shown in FIG. 3 (and as shall be described in more detail below with reference to FIG. 5), the DC voltage component is generated by receiving, from the supply unit, a DC voltage by the probe impedance 303. The DC voltage may be temperature-independent or substantially temperature-independent.

FIG. 4 also shows the demodulated signal 505 which is output by the amplitude demodulator on the basis of the signal 504 and which essentially represents the resonance behaviour of the probe impedance. In the depicted embodiment, the demodulated signal 505 has, due to the temperature dependency of the characteristic curve of the rectifier diode of the amplitude demodulator, a temperature dependency which essentially corresponds to an offset, as is shown schematically in FIG. 4 by the dashed line 508 below the demodulated signal 505. The dashed line 508 shows the output signal of the amplitude demodulator at a lower temperature. It is advantageous to amplify the output signal 505 of the amplitude demodulator in order to obtain sufficiently high reliability in the monitoring of the limit level. As a result, a resolution of the signal may be improved, in particular by several bits. This allows, for example, for a better utilisation of a input range of the A/D converter 306 (shown in FIG. 3). However, as shall be described below, this produces a comparatively large error if the temperature dependency is not compensated for.

Specifically, as is shown by the signal 506, it is necessary for purposes of amplification to first subtract a DC voltage from the output signal 505 and to amplify the difference, so that the amplified signal 507 is obtained.

As can be seen from the dashed signals 509 and 510, which correspond to the output signal 508 of the amplitude demodulator at a lower temperature, the subtraction and amplification also increase the temperature dependency, which may impair a reliable monitoring of the limit level.

However, it has been shown that it is possible to efficiently compensate for this temperature dependency. This allows providing a sensor that may be specified for a wide range of process temperatures. For example, the sensor according to the embodiment may be used for a comparatively wide range of process temperatures, from −40° C. to +115° C., due to the compensation for the temperature dependency.

For correcting the demodulated signal 505, the sensor according to the embodiment has a reference unit 402 (shown in FIG. 3), which is in signal connection with the supply unit 307 in order to receive a temperature-independent or substantially temperature-independent DC voltage signal from the supply unit 307. The reference unit 402 has a diode which is thermally coupled to the rectifier diode of the amplitude demodulator 304. For example, both diodes may be arranged in a common housing of a semiconductor module in order to provide a sufficient heat-conducting connection, as shall be explained below with reference to FIG. 5. However, other configurations for thermal coupling between the diode of the reference unit 402 and the diode of the amplitude demodulator 304 are also conceivable. The diodes may have a substantially identical characteristic curve and/or a substantially identical temperature dependency of the characteristic curve. In particular, the diodes may be structurally identical.

The output signal of the reference unit 402 is a DC voltage signal. This DC voltage signal and the demodulated output signal of the amplitude demodulator are fed as input signals to the amplification unit 305 of the evaluation unit 104, which has a differential amplifier. The temperature dependence of the demodulated signal is compensated for by the difference between the two signals. The input voltage for the reference unit 402 is selected such that the output signal of the differential amplifier does not exhibit a zero crossing and thus has a sufficiently large distance from the zero point. As a result, the determination of the resonance frequency and the amplitude at the resonance frequency allows limit level monitoring at a sufficiently high accuracy.

As is also shown in FIG. 3, the sensor may have a temperature sensor 403. The temperature sensor 403 may be configured to detect a temperature of the rectifier diode of the amplitude demodulator 304 and the diode of the reference unit 402, which are thermally coupled to one another. The supply unit 307 may be configured to adjust the DC voltage signal, which the reference unit 402 receives from the supply unit 307, based on the detected temperature. Additionally or alternatively, the supply unit 307 may be configured to adjust the DC voltage component of the measurement signal and/or a DC voltage component, which is added to the measurement signal using a circuit of the processing unit 104, based on the detected temperature value.

As a result, it can be ensured for each temperature that the output signal of the differential amplifier does not exhibit a zero crossing at the respective temperature and/or that the difference between the demodulated output signal of the amplitude demodulator and the output signal of the reference unit does not reach the limit range of the amplification unit 305. In other words, it is thus possible to optimise the measurement signal and/or the signal processing of the measurement signal on the basis of the detected temperature.

The sensor may be configured such that the adjustment of the DC voltage signal, which the reference unit 402 receives from the supply unit 307, the adjustment of the DC voltage component of the measurement signal and/or the adjustment of the DC voltage component which is added to the measurement signal by a circuit, is performed based on a lookup table. The lookup table may be stored, for example, in a data storage device of the supply unit 307.

In FIG. 4, signals 502 and 503 of a comparative example, which is not covered by the claimed subject matter, are also shown by way of example. The signal 502 is obtained from a measurement signal 501, which is an AC voltage signal, using a high-frequency amplifier. The subsequent amplitude demodulation then results in signal 503. The demodulated signal 503 reflects the resonance behaviour. Also here, an error is generated by the amplitude demodulation (depicted schematically by the signal 511 shown as a dashed line). However, this error is comparatively small because the demodulation is performed after the amplification. However, the use of a high-frequency amplifier entails high costs and reduces the robustness of the sensor. Furthermore, such a high-voltage amplifier has a comparatively high power consumption.

Figure 5:
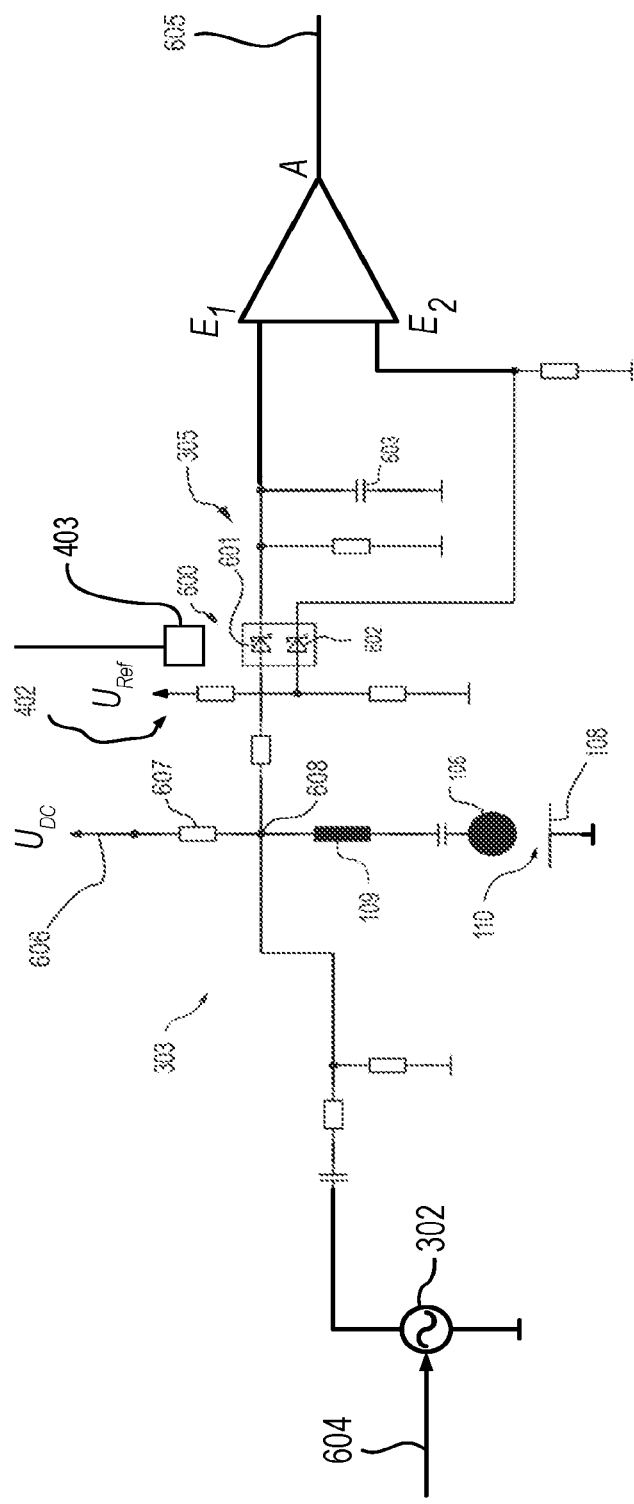
FIG. 5 shows a circuit diagram for the source unit, the processing unit and the reference unit of the sensor shown in FIG. 1 according to the embodiment.

FIG. 5 shows a circuit diagram of the oscillator 302, the probe impedance 303, which consists of the inductance 109 and the measuring capacitance 110, the reference unit 402, the amplitude demodulator 304 (shown in FIG. 3), and the amplification unit 305. The amplitude demodulator 304 (shown in FIG. 3) comprises the signal conversion unit 601 (shown in FIG. 5) as a rectifier diode, as well as the smoothing capacitor 603. The reference unit 402 is supplied by the supply unit with a temperature-independent or substantially temperature-independent DC voltage signal $U_{Ref}$ and has the signal conversion unit 602 as a diode. The signal conversion units 601 and 602 are arranged in a common semiconductor module 600, which may be provided, for example, by the BAT 17-07 semiconductor module manufactured by Infineon, which has two parallel Schottky diodes which are arranged in a common SMD housing.

A positive voltage $U_{DC}$ of 3V at the contact 606, which is connected to the inductance 109 via a resistor 607, increases the measurement signal at node 608, so that the amplitude maxima of the measurement signal exceed the threshold voltage of the rectifier diode 601 of the amplitude demodulator 304 (shown in FIG. 3), as has been described with reference to the signal 504 shown in FIG. 4. The voltage $U_{DC}$ may be temperature-independent or substantially temperature-independent and may be provided by the supply unit 307.

FIG. 5 also shows that the amplification unit has a differential amplifier which amplifies the input signals $E_1$ and $E_2$ to form an amplified output signal $A=V \cdot (E_1 - E_2)$, wherein V is an amplification factor of the differential amplifier. As a result, the amplified resonance curve is output at an output 605 of the amplification unit 305, as is shown as signal 507 in FIG. 4.

The supply unit 307 (shown in FIG. 3) may be configured to adjust the DC voltage signal $U_{Ref}$ and the voltage $U_{DC}$ based on temperatures of a temperature sensor 403, which detects the temperature of the signal conversion units 601 and 602. The temperature sensor may be thermally coupled to the signal conversion units 601 and 602.

Given the depicted embodiment, it was therefore possible to show that it is possible to provide a simply constructed and robust point level sensor which allows for reliable limit level monitoring.

The invention claimed is:

1. A sensor for generating an output signal for detecting a limit level of a medium, a filling level of the medium, and/or for differentiating between different media, the sensor comprising:
    a first circuitry configured to process a measurement signal generated using the sensor; and
    a second circuitry configured to generate a reference signal,
    wherein the first circuitry is further configured to perform temperature compensation using the reference signal,
    wherein the first circuitry and the second circuitry each have signal conversion circuit or circuit element configured to provide temperature-dependent signal conversion, wherein the signal conversion circuit or circuit element of the first circuitry is thermally coupled to the signal conversion circuit or circuit element of the second circuitry to provide a thermal coupling, and
    wherein the temperature compensation comprises compensating for temperature dependency of the signal conversion circuit or circuit element of the first circuitry using the thermal coupling,
    wherein the sensor is configured such that:
        (a) the second circuitry is configured to receive an input signal, which is a DC voltage signal, and to generate the reference signal based on the input signal, and/or
        (b) the measurement signal has an AC voltage component and a DC voltage component, and/or
        (c) the sensor is further configured to add a DC voltage component to the measurement signal using a circuit of the sensor.

2. The sensor according to claim 1, wherein the signal conversion circuit or circuit element of the first circuitry is part of a demodulator of the first circuitry.

3. The sensor according to claim 1, wherein the signal conversion circuit or circuit element of the first circuitry and the signal conversion circuit or circuit element of the second circuitry each have a diode or consists of a diode.

4. The sensor according to claim 1, wherein the processor is further configured to generate an amplified or unamplified signal difference based on the reference signal.

5. The sensor according to claim 1, wherein the reference signal is a DC voltage signal.

6. The sensor according to claim 1,
    wherein the measurement signal has an AC voltage component and a DC voltage component,
    wherein the DC voltage component is generated using a DC voltage, which is received by a probe impedance, and
    wherein the probe impedance is formed by the sensor using the medium.

7. The sensor according to claim 1, wherein:
(a) the signal conversion circuit or circuit element of the first circuitry and the signal conversion circuit or circuit element of the second circuitry are arranged in a common housing, wherein the thermal coupling is effected using the common housing, and/or
(b) the signal conversion circuit or circuit element of the first circuitry and the signal conversion circuit or circuit element of the second circuitry are each part of a common semiconductor module.

8. The sensor according to claim 1,
wherein the sensor is further configured to form a probe impedance using the medium, and
wherein the measurement signal is dependent on the probe impedance.

9. The sensor according to claim 8, wherein the sensor is further configured to apply a signal to the probe impedance, the signal being an AC voltage signal or containing an AC voltage component.

10. The sensor according to claim 9, wherein the sensor is further configured to gradually or continuously change an oscillation frequency of the AC voltage signal.

11. A sensor for generating an output signal for detecting a limit level of a medium, a filling level of the medium, and/or for differentiating between different media, the sensor comprising:
a first circuitry configured to process a measurement signal generated using the sensor; and
a second circuitry configured to generate a reference signal,
wherein the first circuitry is further configured to perform temperature compensation using the reference signal,
wherein the first circuitry and the second circuitry each have signal conversion circuit or circuit element configured to provide temperature-dependent signal conversion, wherein the signal conversion circuit or circuit element of the first circuitry is thermally coupled to the signal conversion circuit or circuit element of the second circuitry,
wherein the temperature compensation comprises compensating for temperature dependency of the signal conversion circuit or circuit element of the first circuitry using a thermal coupling between the signal conversion circuit or circuit element of the first circuitry and the signal conversion circuit or circuit element of the second circuitry, and
wherein the reference signal is a DC voltage signal.

12. The sensor according to claim 11, wherein the signal conversion circuit or circuit element of the first circuitry has a diode, which functions as a rectifier.

13. The sensor according to claim 11,
wherein the second circuitry is further configured to receive an input signal, which is a DC voltage signal, and
wherein the second circuitry is further configured to generate the reference signal based on the input signal.

14. The sensor according to claim 11,
wherein the signal conversion circuit or circuit element of the first circuitry has a diode, which functions as a rectifier, and
wherein the diode is part of a demodulator of the first circuitry.

15. The sensor according to claim 14, wherein the demodulator is an amplitude demodulator.

16. The sensor according to claim 11, wherein the measurement signal has an AC voltage component.

17. The sensor according to claim 16, wherein
(a) the measurement signal further comprises a DC voltage component, and/or
(b) a DC voltage component is added to the measurement signal using a circuit of the sensor.

18. The sensor according to claim 11, wherein the sensor includes a temperature sensor configured to detect a temperature value.

19. The sensor according to claim 18, wherein the temperature sensor is arranged and configured to detect a temperature value of the signal conversion circuit or circuit element of the first circuitry and the signal conversion circuit or circuit element of the second circuitry.

20. The sensor according to claim 18, wherein the sensor is configured to adjust a signal level of the reference signal and/or a signal level of the DC voltage component based on the detected temperature value.

* * * * *